O. A. BLOOM.
POWER ATTACHMENT FOR FORD CARS.
APPLICATION FILED FEB. 15, 1921.
1,400,720. Patented Dec. 20, 1921.
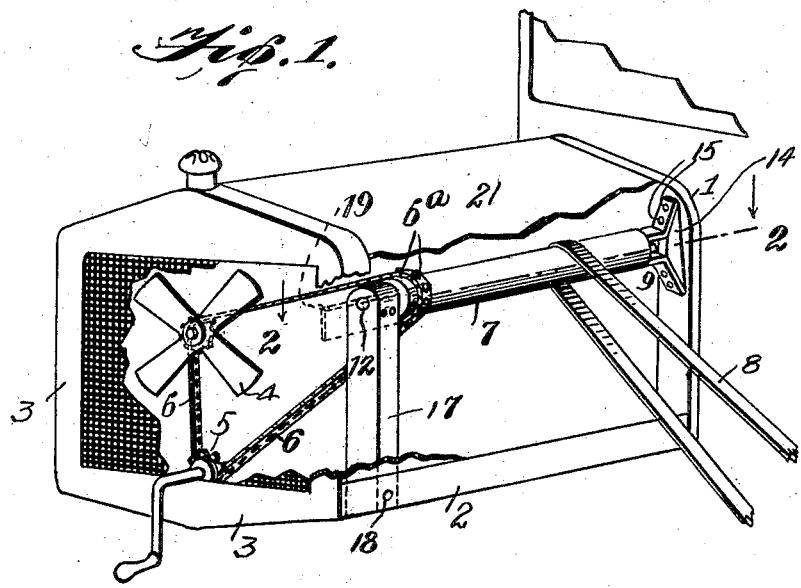
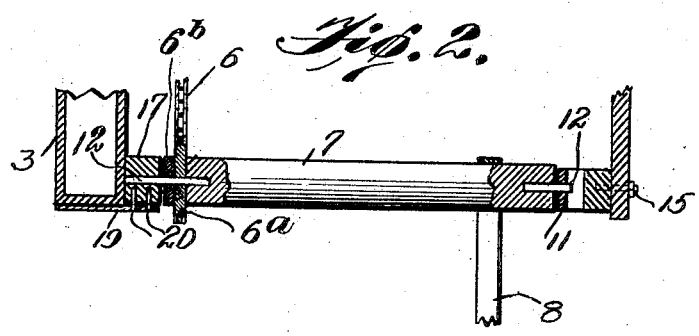
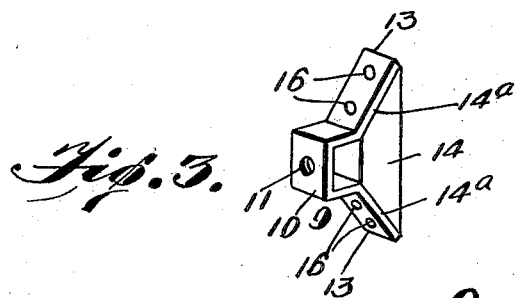
Inventor
O. A. Bloom.
By his Attorneys

UNITED STATES PATENT OFFICE.

ORAL ARVIL BLOOM, OF ONEIDA, KANSAS.

POWER ATTACHMENT FOR FORD CARS.

1,400,720.  Specification of Letters Patent.  Patented Dec. 20, 1921.

Application filed February 15, 1921. Serial No. 445,126.

*To all whom it may concern:*

Be it known that I, ORAL A. BLOOM, a citizen of the United States, residing at Oneida, in the county of Nemaha and State of Kansas, have invented certain new and useful Improvements in Power Attachments for Ford Cars, of which the following is a specification, reference being had therein to the accompanying drawings.

This invention relates to power attachment for Ford cars, and has for its object the construction of a comparatively simple apparatus whereby power can be derived from the motor of an automobile for operating such apparatuses as a grindstone, a washing machine, a wood sawing machine, etc.

With this and other objects in view, my invention comprises certain novel constructions, arrangements and combinations of parts as will be hereinafter described, illustrated in the accompanying drawing, and more particularly pointed out in the appended claims.

In the drawings:

Figure 1 is a perspective view of the apparatus constructed in accordance with the present invention.

Fig. 2 is a sectional view, taken on line 2—2, Fig. 1, and looking in the direction of the arrows.

Fig. 3 is an enlarged perspective view of the bracket and the filler block therein.

Referring to the drawings by numerals, 1 designates the dash of an automobile and 2 is the frame, while 3 is the radiator. The fan 4 and the sprocket wheel 5 have a sprocket chain 6 positioned thereon, and said chain 6 is also positioned upon sprocket wheel $6^a$ contiguous to the long roller 7. A narrow belt 8 is positioned upon the roller 7, which belt 8 is used to operate a grindstone, or a washing machine, or a sawing machine. A bracket 9 is provided for supporting one end of the roller 7 upon the dash 1. This bracket 9 comprises a hollow body 10 provided with an aperture 11, through which aperture extends a stub shaft 12. The hollow body 10 is provided with outwardly-extending feet 13 and between the feet is positioned the filler block 14. Suitable fastening means such as bolts 15 are placed in the apertures 16 and extend through the filler block 14 to the dash 1. It is to be noted that the bracket 9 is substantially V-shaped, and that the block is necessarily provided with inclined or beveled ends $14^a$ for receiving the feet 13 of the bracket 9.

A standard 17 is secured, at 18, within the frame 2 and against the inner portion of the radiator 3, Fig. 2. The standard 17 is also further secured to the radiator, at the top, by means of a plate 19; the plate is soldered or otherwise fastened to the radiator 3 (Fig. 2). A suitable fastening means such as screws or nails 20, extend through the plate and into the standard 17. This plate 19 braces and strengthens the standard 17. A second stub shaft 12 is used for journaling the outer end of the roller 7 and sprocket wheel $6^a$ in the standard 17 near its upper end; this last-mentioned shaft 12, sprocket wheel $6^a$ and roller 7 are fixedly secured together against independent rotary movement. A washer $6^b$ is interposed between the sprocket wheel $6^a$ and standard 17, being loosely mounted on the shaft 12.

The advantage of my apparatus is that by throttling down the motor, one can cause the apparatus to run as slow as desired to permit the belt 8 to be applied to any machine, that is desired to be operated slowly. My apparatus is also easily alined to any machine that is to be driven by reason of the long roller 7, allowing an accurate positioning by reason of the belt 8 being easily slid along the roller; neither one of the belts can be displaced off the roller. My apparatus is always on the machine, and susceptible to being quickly put in operation. The fan 4, operating at the same time the other elements of the apparatus operate, keeps the engine cool. The apparatus is entirely under the hood 21 of the machine and is normally hidden when not in use.

While I have described the preferred form of my apparatus, certain minor changes or alterations may appear to one skilled in the art to which this invention relates, and, therefore, I reserve the right to make such changes or alterations as shall fairly fall within the scope of the appended claims.

What I claim is:

1. In an apparatus of the class described, the combination with a frame and a dash, of a bracket provided with a hollow apertured body and with outwardly-extending apertured feet, said bracket being substantially V-shaped, a filler block between the feet of the bracket, said filler block being substantially V-shaped, said filler block and bracket secured against the dash, a roller journaled at one end in the apertured body of the bracket, means supporting the other end of the roller upon the frame, means for rotating or driving the roller, and means for deriving power from the roller for driving an independent device or apparatus when the roller is rotated.

2. In an apparatus of the class described, the combination with a frame and a dash, of a vertical standard fastened at its lower end to the frame within the same, a radiator contiguous to said standard, a plate secured to the radiator and bearing against the standard, means securing the plate to the standard, a bracket carried by the dash, a roller journaled upon said bracket and standard, means for driving the roller, and means for deriving power from the roller when operated for driving a device or machine.

3. In an apparatus of the class described, the combination with a frame, a dash and a radiator, a sprocket wheel and a fan contiguous to said radiator, of a vertical standard secured at its lower end to said frame, a bracket secured to the dash, a long roller journaled at one end upon the bracket and at its opposite end upon the standard, a horizontally positioned plate fastened to the radiator and also to the standard near its upper end, a sprocket chain upon the fan and said sprocket wheel for rotating or driving said long roller, and a narrow belt upon the long roller and adjustable lengthwise thereof for accurate positioning and imparting power to a machine to be driven at one side of the frame.

In testimony whereof I hereunto affix my signature.

ORAL ARVIL BLOOM.